United States Patent
Suder et al.

(10) Patent No.: US 6,842,505 B1
(45) Date of Patent: Jan. 11, 2005

(54) COMMUNICATIONS SYSTEM ENHANCED WITH HUMAN PRESENCE SENSING CAPABILITIES

(75) Inventors: Eric G. Suder, Plano, TX (US); Harold E. A. Hansen, II, Plano, TX (US)

(73) Assignee: Estech Systems, Inc., Plano, TX (US)

(*) Notice: Subject to any disclaimer, the term of this patent is extended or adjusted under 35 U.S.C. 154(b) by 0 days.

(21) Appl. No.: 09/286,181

(22) Filed: Apr. 5, 1999

(51) Int. Cl.[7] .......................... H04M 1/64; H04M 3/42
(52) U.S. Cl. ................ 379/88.01; 379/67.1; 379/88.12; 379/88.19; 379/201.01; 379/201.06; 379/207.12; 379/214.01
(58) Field of Search ......................... 379/67.1, 34.35, 379/37, 40, 41, 56.3, 88.01, 88.12, 88.19, 88.2, 88.21, 93.09, 118, 170, 171, 179, 201, 258, 262, 263, 265, 201.01, 201.06, 201.07, 201.1, 201.11, 207.12, 214.01, 265.01, 265.11

(56) References Cited

U.S. PATENT DOCUMENTS

| | | | | |
|---|---|---|---|---|
| 4,436,962 A | * | 3/1984 | Davis et al. | 379/211.03 |
| 5,220,599 A | * | 6/1993 | Sasano et al. | 379/142 |
| 5,299,260 A | * | 3/1994 | Shaio | 379/265 |
| 5,493,692 A | * | 2/1996 | Theimer et al. | 455/26.1 |
| 5,515,426 A | * | 5/1996 | Yacenda et al. | 379/201 |
| 5,652,789 A | * | 7/1997 | Miner et al. | 379/201 |
| 5,703,943 A | * | 12/1997 | Otto | 379/265 |
| 5,757,904 A | * | 5/1998 | Anderson | 379/265 |
| 5,822,418 A | * | 10/1998 | Yacenda et al. | 379/201 |
| 5,946,386 A | * | 8/1999 | Rogers et al. | 379/265 |
| RE37,001 E | * | 12/2000 | Morganstein et al. | 379/67.1 |
| 6,201,950 B1 | * | 3/2001 | Fuller et al. | 455/31.2 |

* cited by examiner

*Primary Examiner*—Allan Hoosain
(74) *Attorney, Agent, or Firm*—Kelly K. Kordzik; Winstead Sechrest & Minick P.C.

(57) ABSTRACT

A communications system, which has a plurality of terminals connected thereto, has one or more object presence detecting devices associated with the individual terminals. The detecting devices detect whether or not an object, such as a person, has been detected near any particular and associated terminal and informs the system. The telephone system can then provide a visual indication to other terminals within the system that a person is near their terminal. Such detecting capabilities can also be used to forward communications to another terminal if a user is not near their terminal.

33 Claims, 15 Drawing Sheets

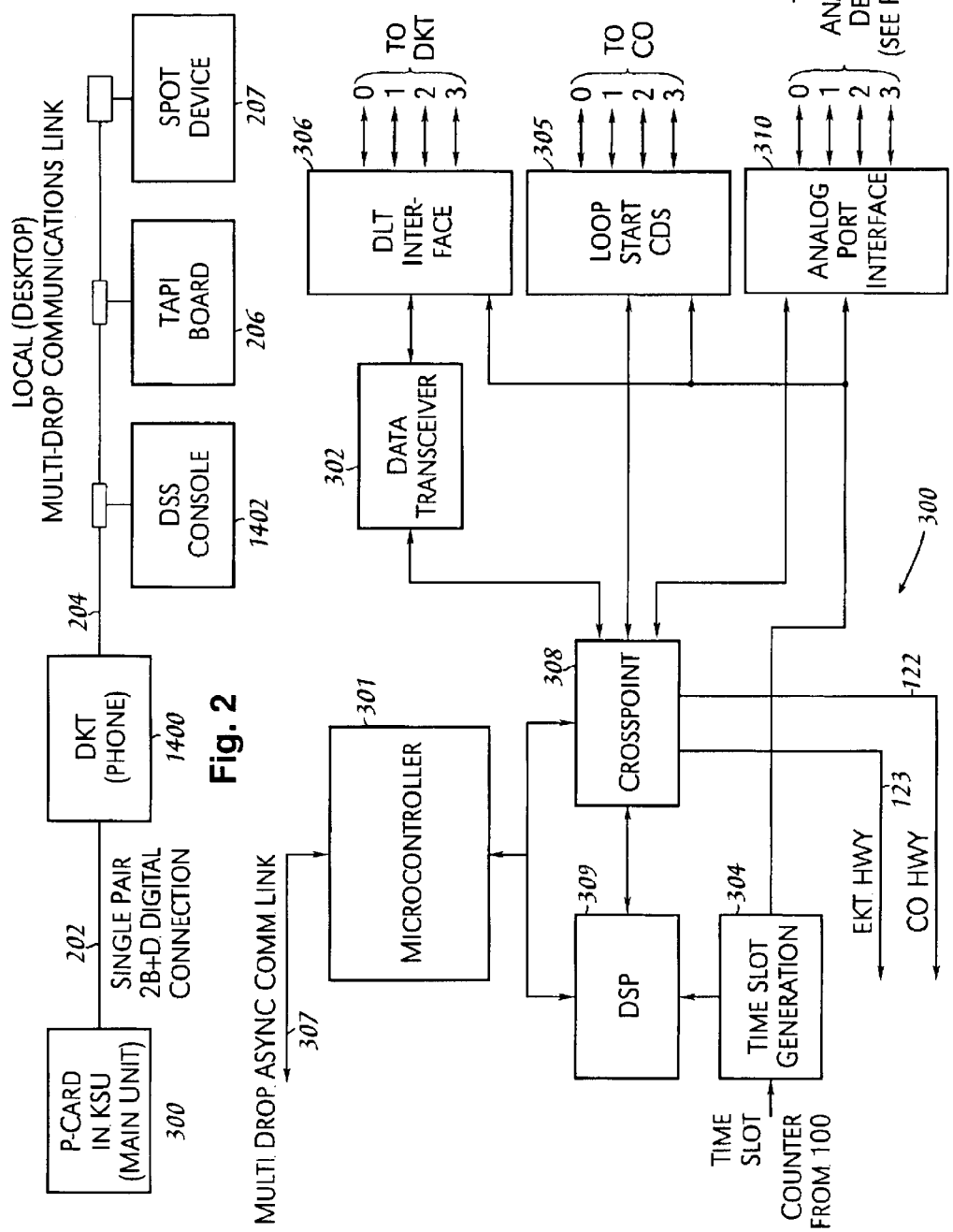

COMMUNICATIONS SYSTEM ENHANCED WITH HUMAN PRESENCE SENSING CAPABILITIES

TECHNICAL FIELD

The present invention relates in general to communications systems, and in particular, to a communications system that uses a sensor to detect when a user is in a vicinity of the communications system.

BACKGROUND INFORMATION

In business, one of the most frustrating problems with communicating with co-workers is the "game" of "telephone tag." Even though voice mail has eliminated the problem of having to guess when to repeat calls to a co-worker, not knowing when the co-worker is in their office, results in having to leave a message for the co-worker to return the call. If both persons have jobs that repeatedly take them out of their office and away from their phone, they eventually fall into the telephone tag game. Naturally, repeatedly making such phone calls and having to leave messages results in a loss of productive time that could be better spent in doing other tasks. Often, a return telephone call is made just after the called co-worker has again left their office.

Therefore, there is a need in the art for a communications system that notifies one person on the system when another person on the system is within the vicinity of their telephone (or computer, etc.). With such a system, a co-worker would know when another co-worker was in their office, and could then make a telephone call (or other type of communication), thus vastly reducing the number of times "telephone tag" is commenced between two co-workers.

SUMMARY OF THE INVENTION

The forgoing need is addressed by the present invention, which implements a sensor (motion detection unit, heat sensor, or any other type of sensor that detects the presence of a human) within the vicinity of a communications system. The sensor signals the communications system when a person is within the vicinity of their telephone, for example, and as a result, informs other users within the overall system that that person is near their telephone.

Communications systems include telephone systems, networked computer systems, and any other systems that permit communications (voice, fax, data, e-mail, etc.) between remote users. Herein, the telephone, computers, or other nodes within the system will be referred to as communications terminals or just terminals.

In one embodiment, an indicator, such as an LED light or screen display, will indicate on other communications terminals within or connected to the system that a particular person is near their terminal. This will permit other persons, seeing the indication, to know when they have a better opportunity of contacting the detected person over the system.

In another implementation of the present invention, a human presence sensor can be implemented with a telephone and/or computer system used within an automatic call distribution (ACD) group to thereby automatically remove or add agents from a queue based on whether the agent is near their terminal.

Yet still another advantage of the present invention is that within an ACD group, the system can also build reports as to agent time "availability."

One advantage of the present invention is when a user sees from the indication on their terminal that a co-worker they wish to communicate with is out of their office, then that user can go directly to the co-worker's mailbox to leave a message.

Another advantage of the present invention is that it eliminates useless trips to an empty office, attempts to call someone who is out of their office, and attempts to conference someone who is not in their office. Furthermore, because of wide area and local area networks, and the Internet, it is possible to indicate another's availability anywhere in the world.

Yet another advantage of the present invention is that the system permits users to divert calls directly to their mailbox when they are out of their office. As a result, not only are callers routed to mailboxes quicker, but also the amount of needless ringing in offices or bullpen areas is reduced, because of the direct insertion into the voice mailboxes.

Yet a further advantage of the present invention provides that retail desk, lobbies, or other areas can be monitored by other terminals to know when someone has entered that area. A prompt can be recorded and programmed to automatically play a greeting to the approaching party.

Yet an additional advantage of the present invention is that it can be used to show the availability of conference rooms or activity in other areas such as break rooms, warehouses, etc.

A further advantage of the present is that calls to an attendant that is in an "away" condition can be immediately forwarded to another station or to an auto-attendant.

Another unique advantage of the present invention is that when a user returns to their office, the system can automatically inform the user that a message has been taken while away. Furthermore, another advantage of the present invention is that a greeting can be played to a user the first time they visit their office after a specified time period, such as the previous night.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates communication of a motion detection unit with the telephone system in FIG. 1;

FIG. 3 illustrates, in block diagram form, components of a port card implemented within the telephone call/voice processing system of FIG. 1;

DETAILED DESCRIPTION

Figure 1:
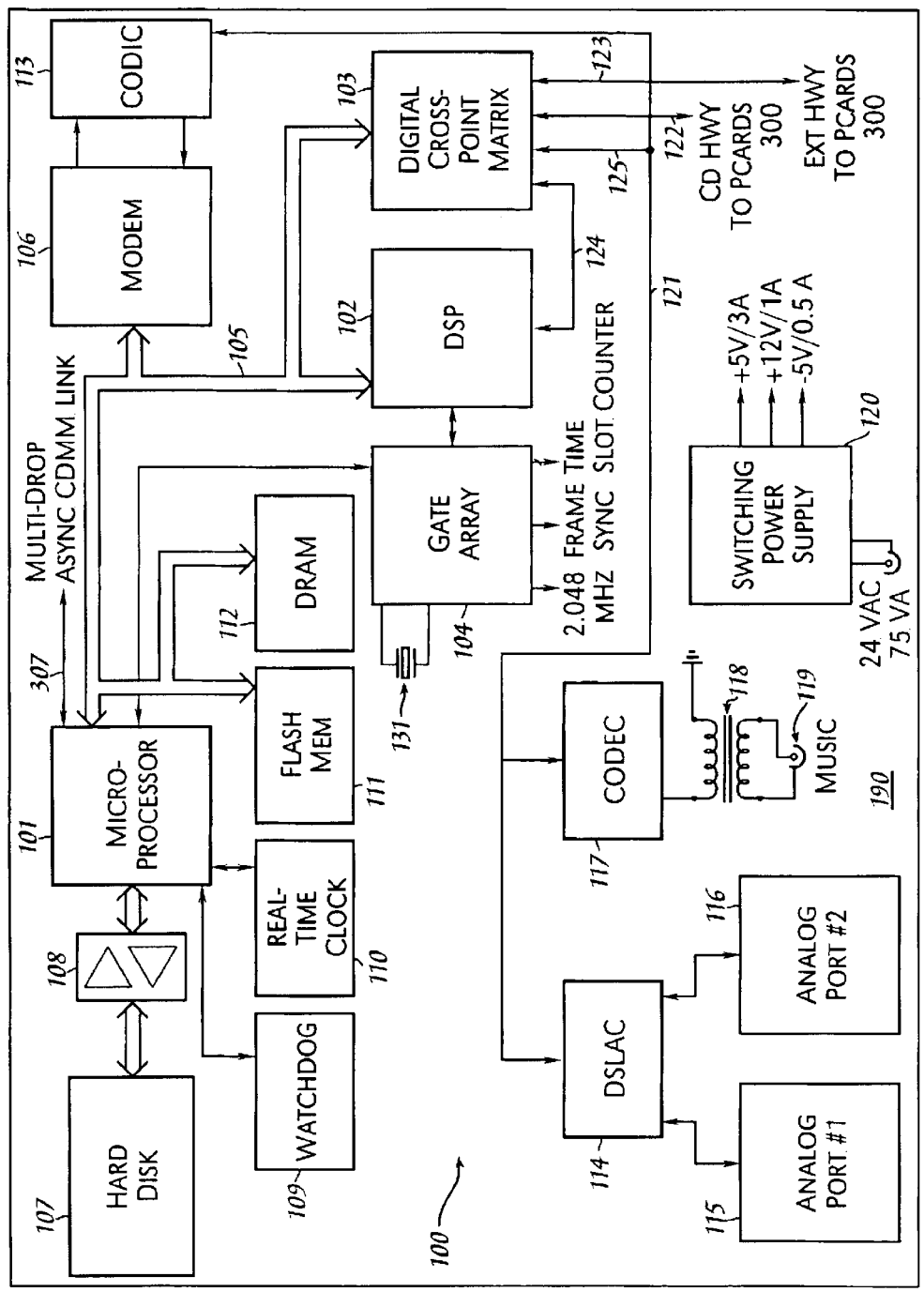
FIG. 1 illustrates, in block diagram form, components of a telephone call/voice processing system configured to operate in accordance with the present invention.

In the following description, numerous technical details are set forth such as specific visual indicators and specific hardware interfaces, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated, in block diagram form, system 100 for telephone call and voice processing. System 100 is adaptable for use in accordance with the present invention, though it should be understood that the principles of the present invention are not limited to implementation in a telephone system as described herein, but are applicable to data processing/information handling systems, and any other systems that enable users to communicate.

Microprocessor 101 communicates with hard disk 107 using driver circuitry 108. Hard disk 107 stores program data, voice prompts, voice mail messages, and all other types of speech used within system 100. Microprocessor 101 also includes watchdog timer 109 and real-time clock source 110.

Microprocessor 101 is coupled via bus 105 to flash memory 111 and dynamic random access memory ("DRAM") 112. Flash memory 111 is used to store bootstrap data for use during power up of system 100. DRAM 112 stores the programs accessed by microprocessor 101 during operation of system 100. Bus 105 also couples microprocessor 101 to signal processing circuitry, which in this example is digital signal processor ("DSP") 102.

Figure 5:
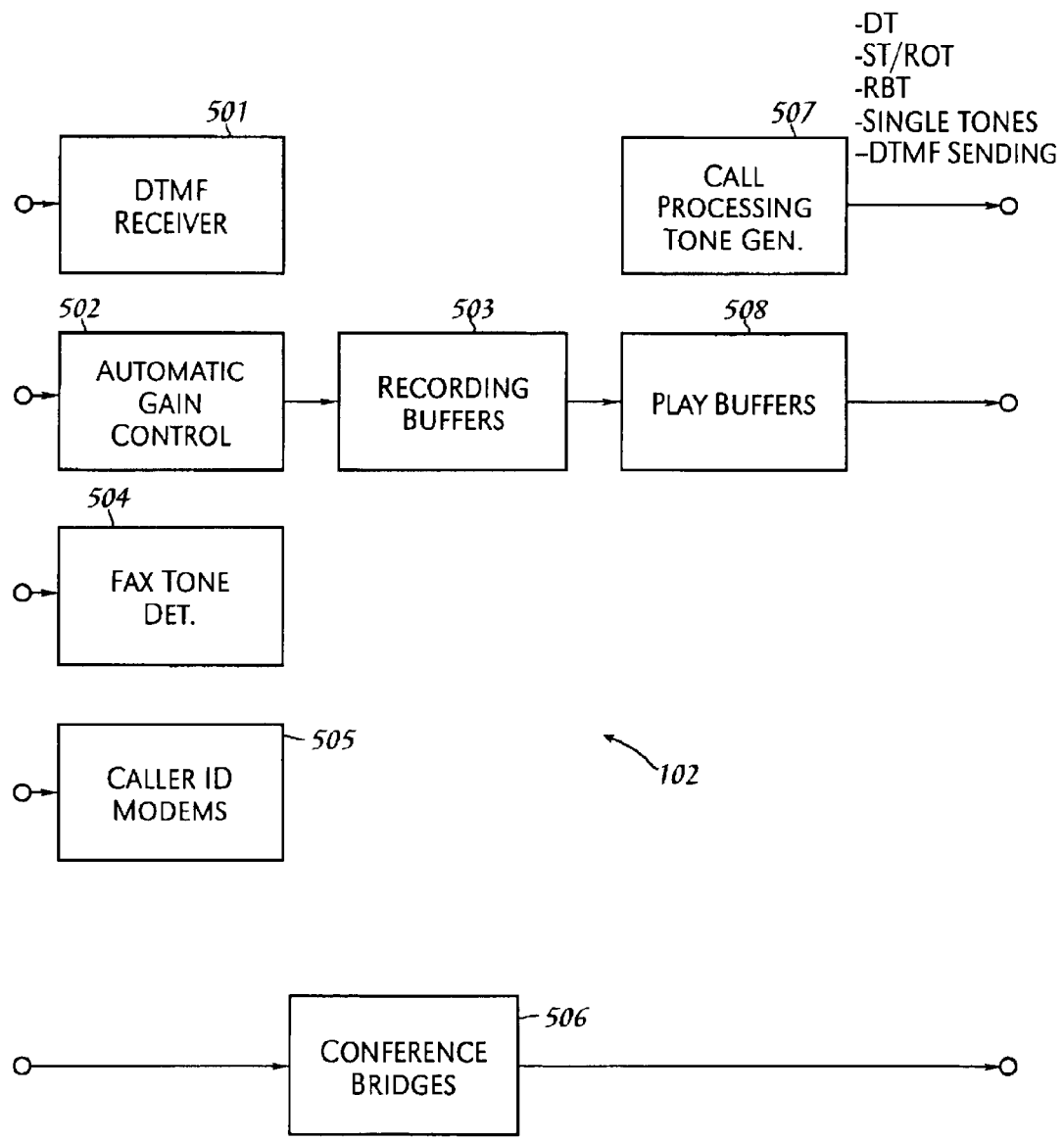
FIG. 5 illustrates functions implemented within a signal processing circuit within the telephone call/voice processing system of FIG. 1.

Referring next to FIG. 5, there are illustrated some of the primary functions implemented in DSP 102. DTMF receivers 501 are implemented using frequency domain filtering techniques. DTMF receivers 501 detect all 16 standard DTMF (touch-tone) digits. Automatic gain control ("AGC") 502 is a closed-loop gain control system which normalizes received audio levels during recording. Recording buffers 503, which are coupled to AGC 502, receive and store speech samples after they have passed through AGC block 502. These speech samples are converted to $\mu$-law PCM (Pulse Code Modulation) and double buffered (several samples per buffer). Microprocessor 101 copies the record data out of DSP buffers 503 into RAM buffers (not shown), which are located in the microprocessor 101 data RAM area. Fax tone detector 504 is implemented using frequency domain filtering techniques. Fax tone detector 504 detects the standard 1100 Hz FAX CNG tone (also referred to as the Calling Tone). Caller ID data is transmitted from the Central Office ("CO") using a Frequency Shift Keying ("FSK") modulation scheme. FSK works by converting binary data to tones that can be transmitted over the voice network. The CO transmits the caller ID data between the first and second rings of the phone. The caller ID data is received in the form of tones by caller ID modems 505. These tones are then converted back to digital caller ID data. Call processing tone generators 507 are free running oscillators which generate the appropriate tones (and tone pairs) which make up the industry standard call processing tones.

Play buffers 508 replay data from hard disk 107 through microprocessor 101 and place this play data in buffers 508. This data is converted from an 8-bit $\mu$-law PCM signal to 14-bit linear data. Conference bridges 506 allow multiple conference bridges to mix together conferees into a multi-party conference. These conferees may be a mixture of inside and outside parties.

DSP 102 communicates with microprocessor 101 via a host interface port ("HIP") via bus 105. The HIP link supports a command-based protocol, which is used to directly read or write DSP memory locations. DSP 102 is a RAM-based part and has its program downloaded from microprocessor 101. Once downloaded and running, microprocessor 101 (the host) polls for events or receives interrupts indicating that data is available. DSP 102 speech connections are made over an industry standard 32-time slot, 2.048 megabits per second (Mb/s) digital serial link 124. Link 124 occupies one of the digital highways implemented by digital cross-point matrix 103. Each service of DSP 102 occupies a single time slot. For example, DTMF receiver 1 occupies time slot 0 while conference bridge circuit 12 occupies time slot 31.

Digital cross-point matrix 103 is also coupled to bus 105 and operates to connect any voice path to any other voice path. Digital cross-point matrix 103 is a VLSI (Very Large Scale Integration) integrated circuit. An example of digital cross-point matrix 103 is manufactured by MITEL Semiconductor Corporation as part No. 8980. Digital cross-point matrix 103 communicates with microprocessor 101 via a memory mapped input/output (I/O) scheme. A command/control protocol is used for communication between microprocessor 101 and digital cross-point matrix 103 via bus 105. Cross-point matrix 103 is coupled by highway 124 to DSP 102. Cross-point matrix 103 is coupled by connection 125 to highway 121. Cross-point matrix 103 is also coupled to peripheral cards by highways 122 and 123. The peripheral cards are described in further detail below with respect to FIG. 3.

Connections 121–125 are referred to as "highways", which are transmission links using time-division multiplexing ("TDM") as a means for transmitting and receiving data.

Digital cross-point matrix 103 is capable of making 256 simultaneous fully non-blocking connections within system 100. However, system 100 may be upgraded by adding additional DSPs and/or cross-point matrices.

Cross-point matrix 103 makes connections using the TDM highway by receiving instructions from microprocessor 101 to interconnect channels within the frames of the TDM bit stream. This results in the non-blocking capability of cross-point matrix 103, and also allows for a single voice resource, caller, or voice message to be simultaneously coupled to multiple other voice resources, station or CO originated callers, and/or voice messages.

Gate array 104 is an SRAM (Static Random Access Memory) based device. An example of gate array 104 is manufactured by XILINX. Gate array 104 is responsible for generating all system timing. A master clock signal is provided by microprocessor 101. This clock signal is divided down to provide a number of phase coherent system clocks. In addition, a time slot counter is implemented which allows all the system CODECs to detect the appropriate time slot to use (0–31).

Gate array 104 is downloaded at boot-up by system software. Gate array 104 is based on an SRAM architecture. That is, the internal fusible links commonly found in programmable logic are actually stored in volatile SRAM. Because of this architecture, gate array 104 is downloaded after power-up. Also, note the added flexibility of being able to modify the logic by simply loading new system software.

Bus 105 is also coupled to modem 106, which provides a capability of calling into system 100 on a remote basis to load additional programs, voice prompts, etc., or updates thereto, into hard disk 107. Modem 106 is coupled to coder/decoder ("CODEC") 113, which is coupled to highway 121. This connection allows coupling of modem 106 through cross-point matrix 103 to CO lines through highway 122 and the p-card described below with respect to FIG. 3.

Also coupled to highway 121 is dual subscriber line access chip 114, which is well-known in the art, and which is coupled to analog ports 115 and 116, which provide an ability for system 100 to communicate to analog-type connections such as cordless telephones, fax machines, and computer networks, such as the Internet.

Highway 121 is also coupled to CODEC 117, which is coupled to transformer 118 to a music source 119, which provides an ability to couple an external music source to a caller through cross-point matrix 103 for such things as providing the caller with music on-hold.

Power to system 100 is provided through switching power supply 120, which converts AC to the various DC supply voltages needed by circuitry within system 100.

Referring next to FIG. 3, there is illustrated peripheral-card ("p-card") 300, which is coupled to main board 190 of system 100. Main board 190 communicates with p-card 300 via a multi-drop async serial link 307. This connection 307 is made directly to microprocessor 101 (via buffers not shown). P-card 300 provides interconnections between CO lines and extension lines to system 100. Microcontroller 301 is an 8-bit microcontroller, an example of which is manufactured by Hitachi as Part No. H8, which controls all the real-time functions associated with p-card 300. Microcontroller 301 is responsible for all low-level communication with the DKTs 1400 (digital key telephones) (see FIGS. 2 and 8) and CO lines. A low level event is an event which is specific to the hardware and is required to be handled in real-time. These events are unique to the DKT or CO trunk protocol. In contrast, high level events can be abstracted to have no correlation to actual hardware. An example of a high level event might be "Turn the SPKR LED On." The corresponding low-level event would be "Send HEX Code 21 to DKT Address 4." This level of abstraction helps stabilize the complex system software. Another example would be that system software can send a command to seize a CO trunk without being concerned with the low-level differences between a ground start or DID trunk. Some of the low-level tasks include updating DKT LEDs and LCD displays, decoding key press messages from the DKTs 1400, scanning the CO status bits and filtering RING and CO seizure events. Microcontroller 301 converts these low-level real-time events to high-level events which form a protocol referred to as the ESi Command Language (ECL). This ECL protocol is implemented on multi-drop async serial channel 307 between main board 190 and all p-cards 300 in system 100. Microcontroller 301 contains two async serial ports. One of these serial ports is connected to main board 190, and the other port drives data transceiver and multiplexer 302.

When p-card 300 is plugged into main board 190 (via ribbon cable (not shown)) a card address is assigned to p-card 300. This card address is read by microcontroller 301 and is used to filter commands over communication link 307. When main board 190 software wants to communicate with the specific p-card 300, the address is sent in the message packet which all p-cards 300 receive. P-cards 300 match the address in the message to the hard wired address on the ribbon cable. If a match is made, only that p-card 300 responds to the command set.

Microcontroller 301 contains an internal program memory (not shown) which contains a bootstrap program which upon reset or power-up requests a fresh firmware load from main board 190. This firmware load is stored in the main memory of microcontroller 301. Upon completion of the load, the program is executed from main memory. This scheme allows for microcontroller 301 firmware to be updated and loaded at any time.

Main board 190 sources all system timing through block 304. Timing signals to p-card 300 consists of a 2.048 MHz clock signal, an 8 KHz frame sync, which signifies the first time slot of a 32 time slot highway, and 5 time slot counter bits, which represent a binary count from 0 to 31.

As mentioned above, p-card 300 is assigned a card slot address when it is connected to main board 190. This card slot address is used to calculate which time slots p-card 300 should be using. The time slots used for the CO CODECs 1204 (see FIG. 7) are actually generated by the time slot assignment circuitry contained in the DSLAC chip. There are two separate 2.048 MHz (32 time slot) highways 122 and 123 that run between main board 190 and p-card 300. One (123) is for the DKTs 1400 and the other (122) is for the COs.

Figure 6:
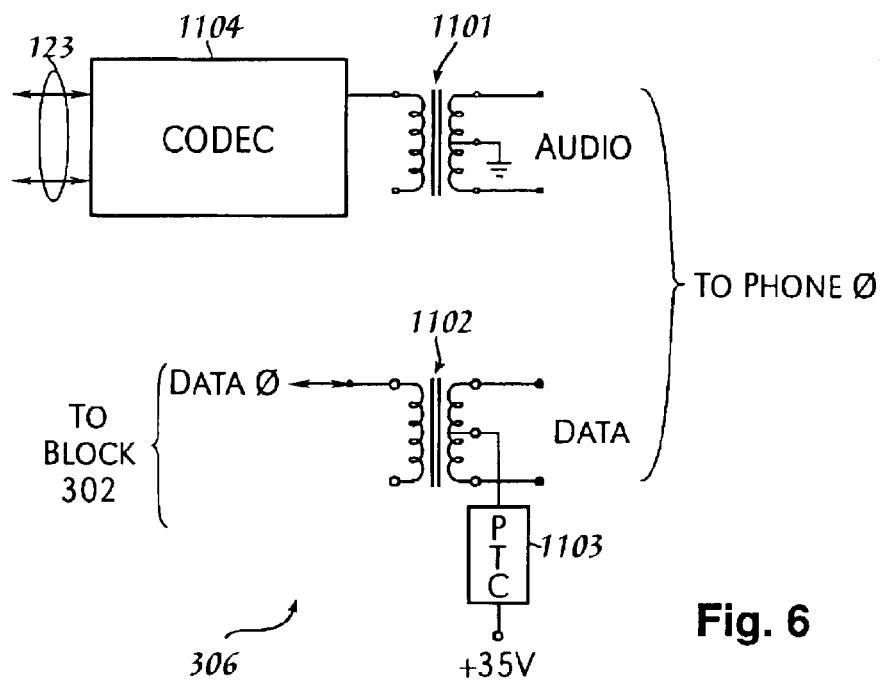
FIG. 6 illustrates an electronic key telephone interface.

Referring to FIGS. 3 and 6, DKT interface 306 describes the connection between system 100 and DKT 1400. This interface consists of two physical pairs of wires running between system 1100 (often referred to as a Key System Unit (KSU)) and DKT 1400. One of these pairs supports an analog bi-directional audio path and the other supports a bi-directional digital control channel.

DKT 1400 is connected to the KSU via transformers 1101 and 1102, providing a high degree of isolation as well as longitudinal balance. Transformer 1101 is for the audio path and transformer 1102 is for the data path on each end of the connection. Power is supplied to DKT 1400 by phantoming the power through the center taps of transformers 1101 and 1102. The KSU supplies a nominal voltage of 36 volts DC which passes through a positive temperature co-efficient varistor ("PTC") 1103. PTC 1103 acts as a resettable fuse which becomes very resistive during excessive current flow (such as when a short in the station wiring occurs). DKT 1400 regulates down to +12 and +5 volts.

The audio path is a dry analog bi-directional path consisting of a traditional hybrid (2:4 wire converters) on each end. The audio path on p-card 300 is converted to a 4-wire path by the hybrid circuit in interface 306. The separate transmit and receive paths are gain adjusted and connected to CODEC 1104. CODEC 1104 converts the analog signals to digital and presents these voice signals to DKT highway 123. DKT highway 123 consists of a 2.048 Mb/s serial stream which is divided into 32 64 Kb/s time slots. Each CODEC 1104 occupies one time slot on highway 123.

System 100 reserves two time slots per DKT 1400 for a fully digital 2B+D connection 202 (FIG. 2) where two 64 Kb/s digital channels are available to each station instrument. Note that the present invention could be implemented with electronic key telephones.

Timing for CODECs 1104 is supplied by time slot generation block 304, which is coupled to the time slot counter output from system timing block 104 (see FIG. 1).

The DKT data is produced by a UART (Universal Asynchronous Receiver/Transmitter) in microcontroller 301. This NRZ transmit and receive data is presented to data transceiver and multiplexer 302. A single data transceiver is used for all 8 DKT circuits and is multiplexed through an 8-channel analog mux to each DKT data transformer 1102 in a round-robin fashion. Messages to DKT 1400 consist of commands such as POLL, TURN_ON_LED, WRITE_ LCD_CHARACTER, RING PHONE, etc. Response messages from DKT 1400 consists of a lower level key command in the first 5 bits and a single hook switch bit in the 8th bit. If the 7th bit of the response message is set, a high level response command such as FIRMWARE_VERSION or TERMINAL_TYPE is present in the first 5 bits.

Figure 7:
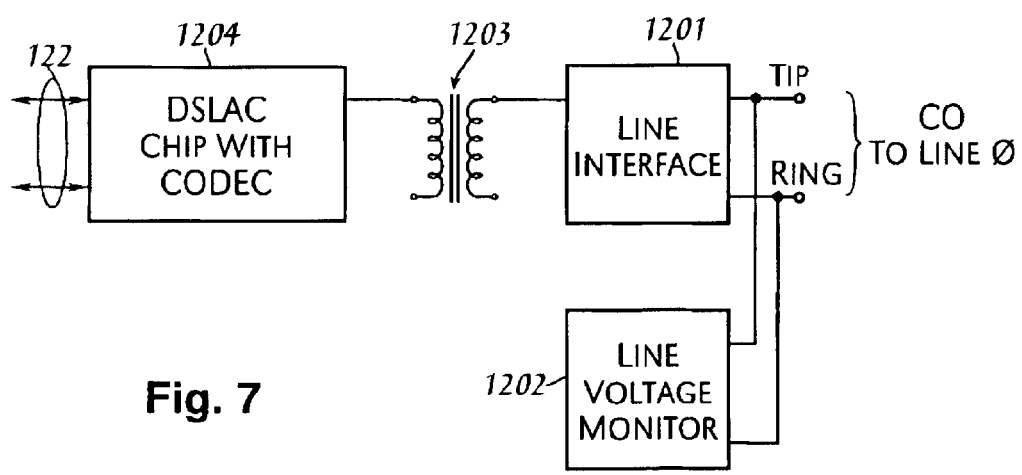
FIG. 7 illustrates a loop start CO interface.

Referring next to FIGS. 3 and 7, the loop start central office (CO) lines are supplied by the local telephone company and consist of a wet balanced differential audio pair. The term "wet" refers to the fact that a voltage of −48 volts is present on the pair. System 100 requests dial tone from the CO by providing a nominal 200 ohm loop across the TIP and RING conductors and releases the connection by opening the loop. The CO rings system 100 by placing a 90 vrms AC, 20 Hz sine wave on the TIP and RING conductors. System 100 seizes the line by going off hook. P-card 300 incorporates a unique circuit which monitors the voltage present across TIP and RING of each CO. This line voltage monitor circuit 1202 serves to detect the ring voltage present during ringing (ring detection) and the unique feature of monitoring the CO line status for conditions such as whether the CO is plugged in or if someone is off hook in front of system 100. The latter can be used to detect theft of service or allow a credit card verification terminal to be used without interfering with normal system operation. Voltage monitor 1202 consists of a balanced differential op-amp connected across TIP and RING of the CO lines through a very high impedance (>10M ohms). The output of the four voltage monitor op-amps are fed to an analog-to-digital converter with a built-in analog multiplexer (not shown). Microcontroller 301 firmware monitors the line voltages. There is also a balanced differential AC coupled op amp across the CO TIP and RING to monitor the low level audio tones present during caller ID. The output of these op-amps are selected via an analog switch during the idle period and are connected to the CO line CODEC 1204.

Figure 8:
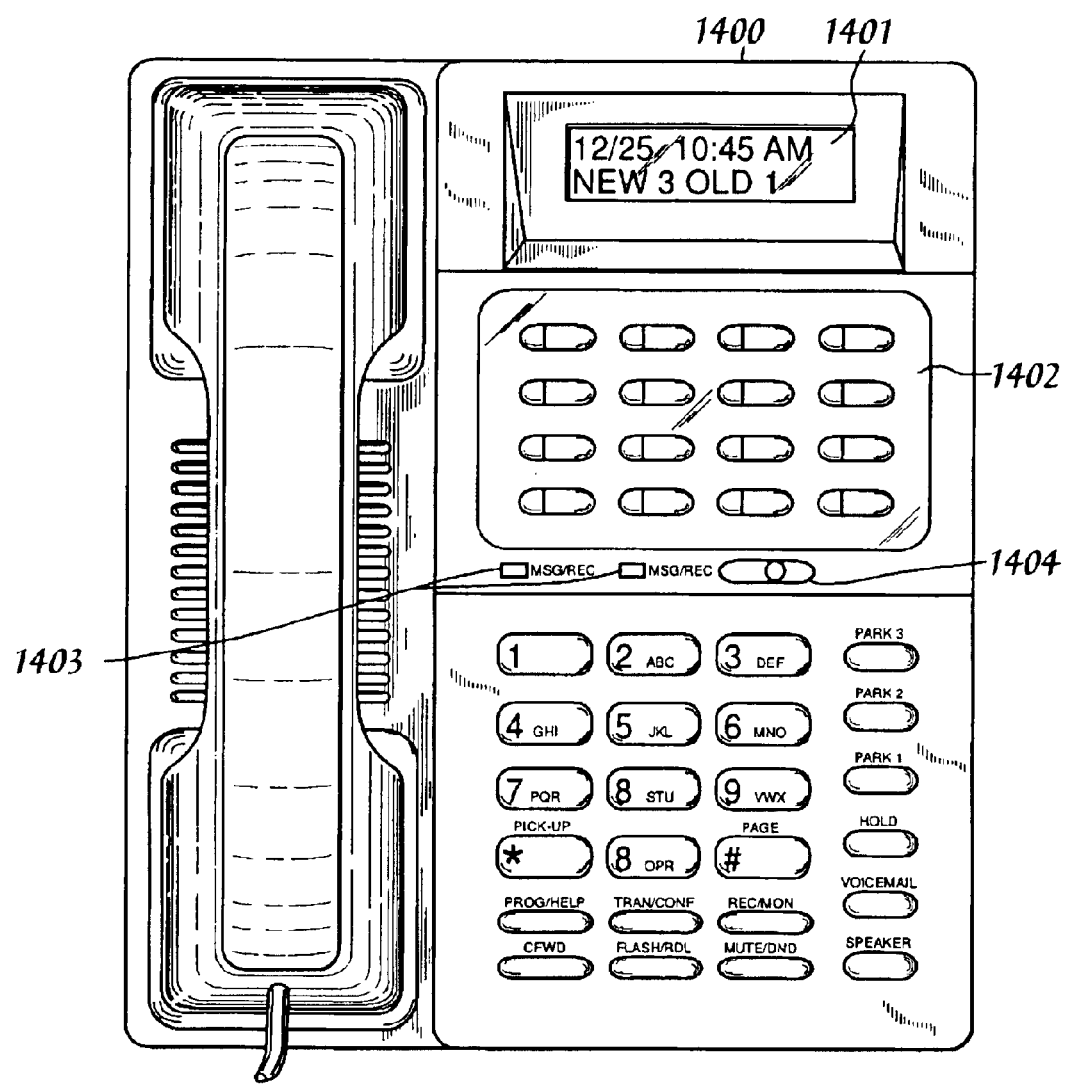
FIG. 8 illustrates a communications terminal (i.e., DKT)

Referring next to FIG. 8, there is illustrated DKT 1400, which includes many of the well-known features of a typical telephone, such as LCD display 1401, soft feature keys (DSS) 1402 for such features as Station, Speed Dial, Line Keys, etc., speaker/handset volume control 1404, and message and speaker LEDs 1403. As noted previously, an EKT (electronic key telephone) can be used instead of a DKT.

Referring next to FIG. 2, the SPOT device 207 is an object (e.g., human) presence detecting unit (e.g., motion sensor, heat sensor, etc.) that is attached to (or part of) the phone 1400, or located within the vicinity of the phone 1400, and senses when a person is available or away from the phone 1400, such as within a person's office. When motion has not been detected for a programmable interval, SPOT signals to the system that the user is "AWAY." Corresponding visual indicators on other phones in the system may indicate this "AWAY" condition. As an example, a corresponding DSS key 1402 on another phone in the system will turn amber indicating such an "AWAY" condition. "AWAY" may show on the display 1402 of those calling from a phone without a DSS key assigned for the station. Stations in "do not disturb" may wink amber to distinguish them from "AWAY."

The SPOT device 207 may have a human presence-sensing lens at one end and an RJ11 connector at the other for connecting with the phone 1400. The SPOT device 207 is connected to the RJ11 line jack of phone 1400 via a cable 204. The unit 207 may be attached to the side of the phone 1400 with hook-and-loop strips. However, the SPOT device 207 can be located anywhere in the room if a different field of view is desired. The range of detection is adjustable.

The SPOT device 207 is connected through the phone 1400 to the P-card 300; this connection acts as a transparent communication path between the SPOT device 207 and the P-card 300 firmware.

The SPOT device 207 connects to a multi-drop communications link (serial bus) 204 supported by the DKT phone 1400. This serial bus 204 allows for connection of multiple peripheral devices, such as the DSS console 1402, computer telephony interfaces (TAPI) 206, and the SPOT device 207. The SPOT device 207 is polled for activity by the DKT 1400, and reports any activity to the P-card 300 via a simple messaging scheme over the 2B+D digital connection 202. The SPOT device 207 reports either "human present," or "no human present," to the P-card 300. It is possible for the P-card 300 to send configuration data to the SPOT device 207 (i.e., sensitivity settings, etc.). Once the P-card 300 receives the events, decisions are made as described in the flow diagrams.

Figure 4:
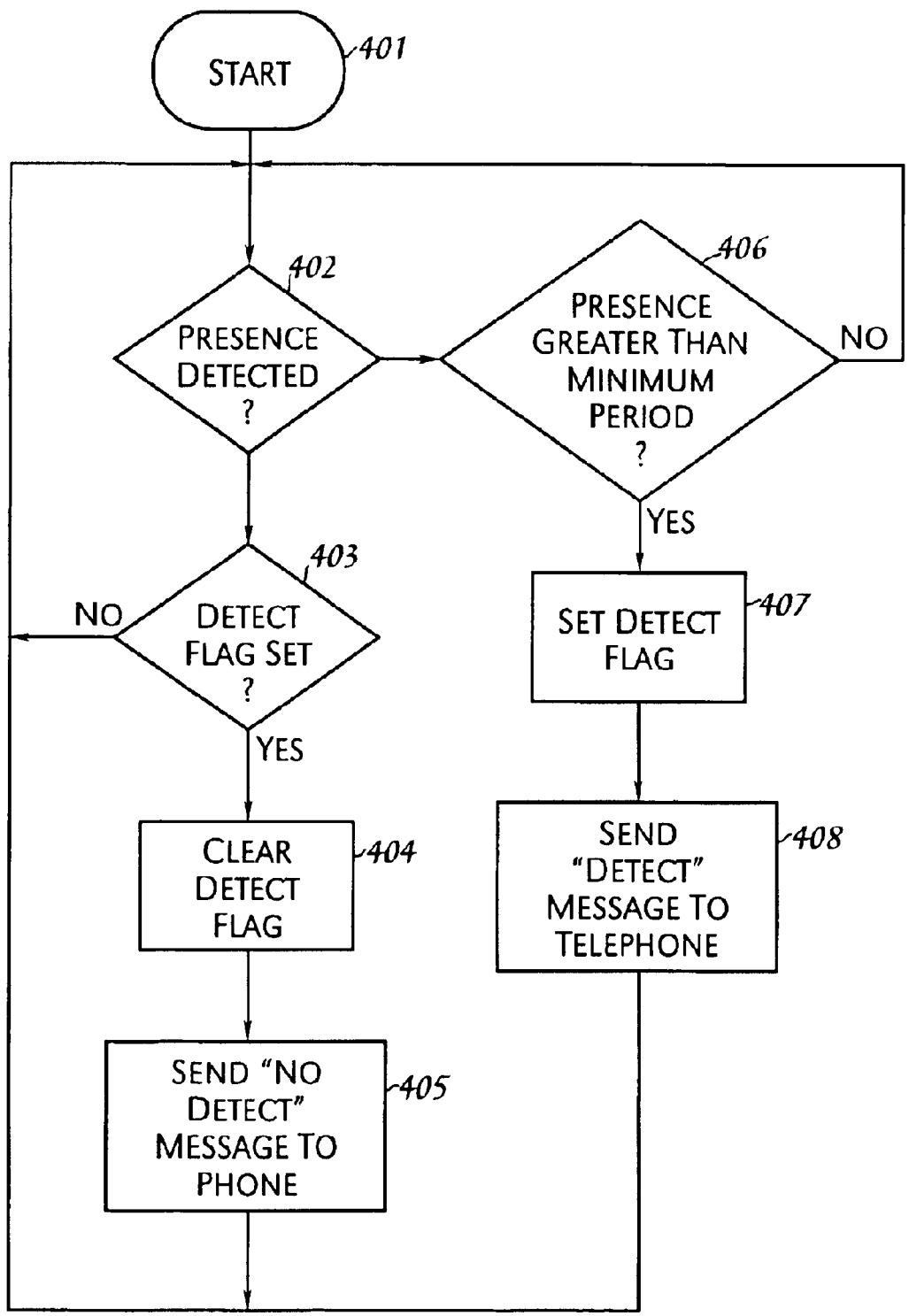
FIG. 4 illustrates a process for detecting motion near a telephone set and notifying the telephone system.

Referring to FIG. 4, there is illustrated a process for detecting presence of a human and sending such events through the DKT 1400 to the P-card 300 within the SPOT device 207. The process begins in step 401, and in step 402, a determination is made whether a human within the vicinity of the SPOT device 207 (and the phone 1400) has been detected. If not, then in step 403, a determination is made whether a "detect" flag had been previously set. This detect flag is further discussed below with respect to step 407, and corresponds to an earlier detection of human presence by the SPOT device 207. If the detect flag had not been previously set, then the process merely returns to step 402 to again detect for human presence. However, if the detect flag had been previously set, then in step 404, the detect flag is cleared, and then in step 405, a "no detect" message is sent through the phone 1400 to the P-card 300.

In step 402, if human presence has been detected, then the process proceeds to step 406 to determine if the presence has occurred greater than a minimum period of time. Such a minimum period of time is adjustable for filtering out those occurrences when the target has moved outside of the detection field temporarily. If not, the process returns to step 402. However, if presence has been detected for greater than a minimum period of time, then the process proceeds to step 407 to set the detect flag, and in step 408, a "detect" message is sent through the telephone 1400.

Figure 9:
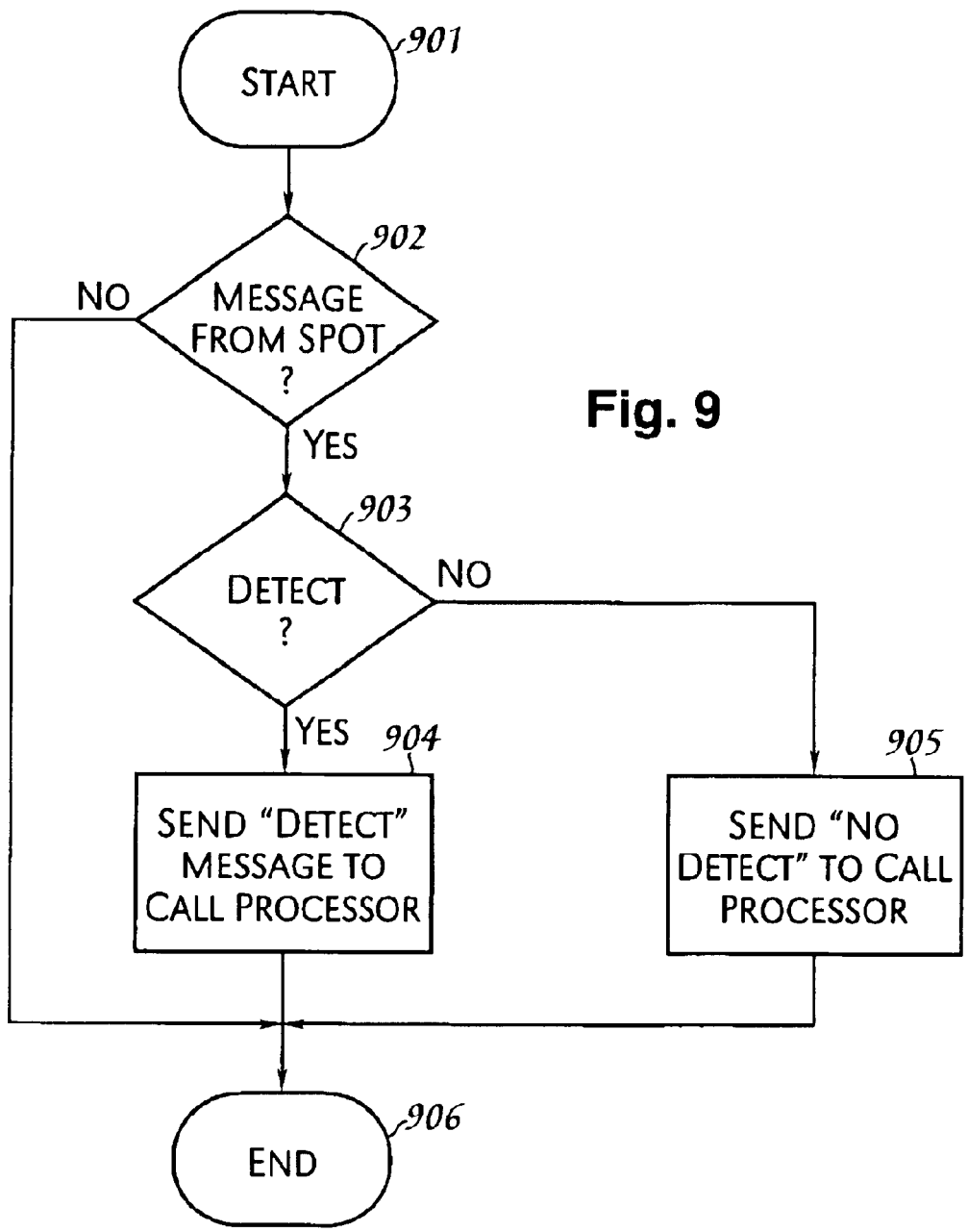
FIG. 9 illustrates a process for detecting motion within a telephone set.

Referring next to FIG. 9, there is illustrated the process occurring within telephone 1400 in response to receipt of the "detect" and the "no detect" messages from the SPOT device 207. After the start step 901, in step 902, a determination is made whether any type of message has been received from the SPOT device 207 by the telephone 1400. If not, the process ends at step 906. However, if a message has been received from the SPOT device 902, the process proceeds to step 903 to determine whether the message is a "detect" message or a "no detect" message. If the message received from the SPOT device 207 is a "detect" message, then in step 904, a "detect" message is sent to the processor 100 from the P-card 300. The process will then end at step 906. If in step 903, a "no detect" message has been received from the SPOT device 207, then the telephone 1400 will forward a "no detect" message to the processor 100, with the process then ending at step 906.

Figure 13:
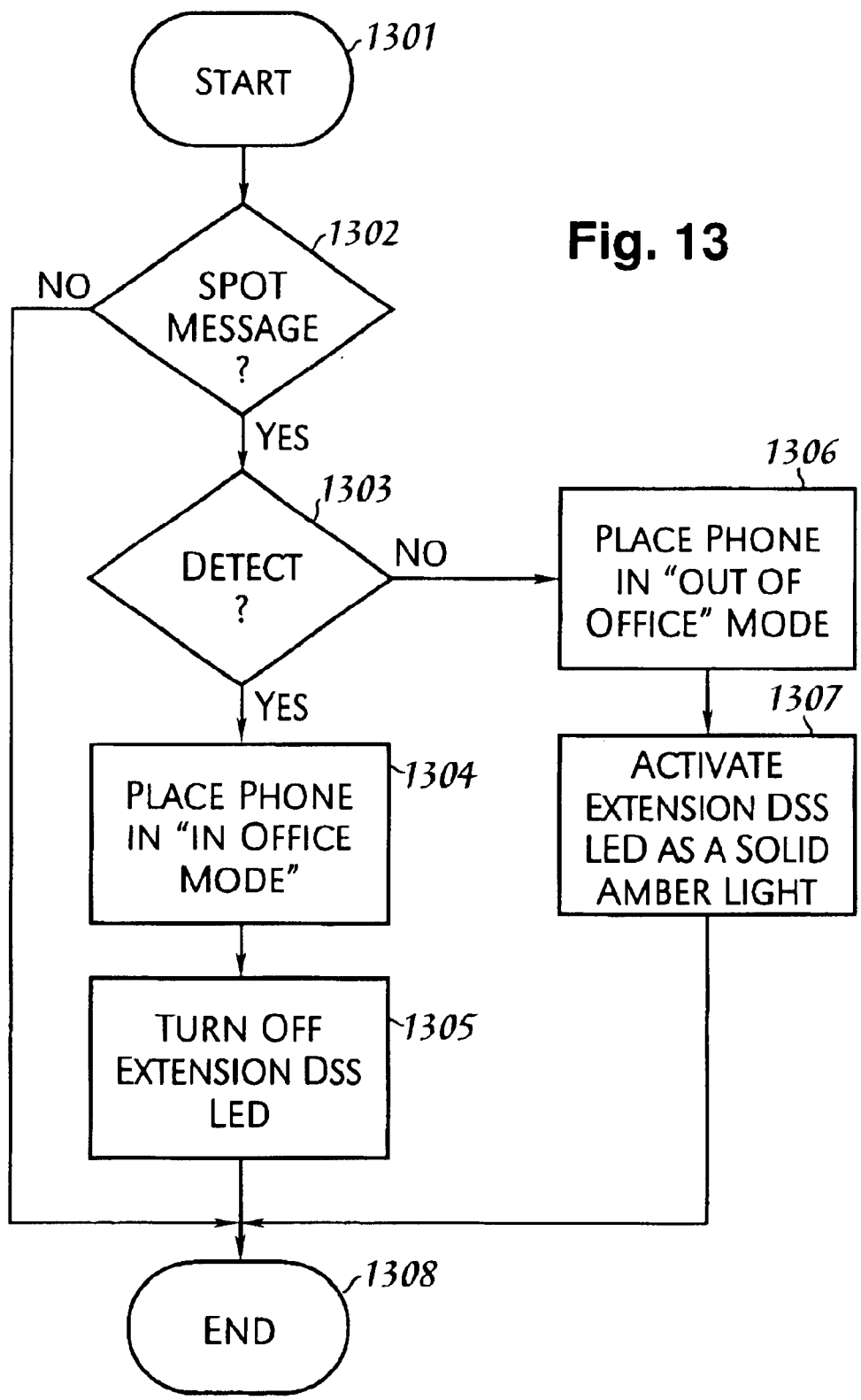
FIG. 13 illustrates a process for informing another telephone set of the presence or absence of a user near a specified telephone set.

Referring to FIG. 13, there is illustrated a process in accordance with the present invention. After the beginning step 1301, the process proceeds to step 1302 to determine if the processor 100 has received a SPOT message. If not, the process ends at step 1308. However, if in step 1302, a SPOT message has been received, then the process proceeds to step 1303 to determine if the message is a "detect" message or "no detect" message. If the message is a "detect" message, then the extension associated with the telephone 1400 associated with the SPOT device 207 is placed in an "in office" mode (state stored in a database) by processor 100, and in step 1305 any extension DSS LED(s) on any other telephones 1400 within the telephone system will be turned off, thus indicating to those telephone users that the person associated with the SPOT device is in their office.

However, if a "no detect" message is received, then the process will proceed from step 1303 to step 1306 to place that particular extension in an "out of office" mode (state), and in step 1307, extension DSS LED(s) on selected other telephones within the system will be given a solid amber light.

Figure 10:
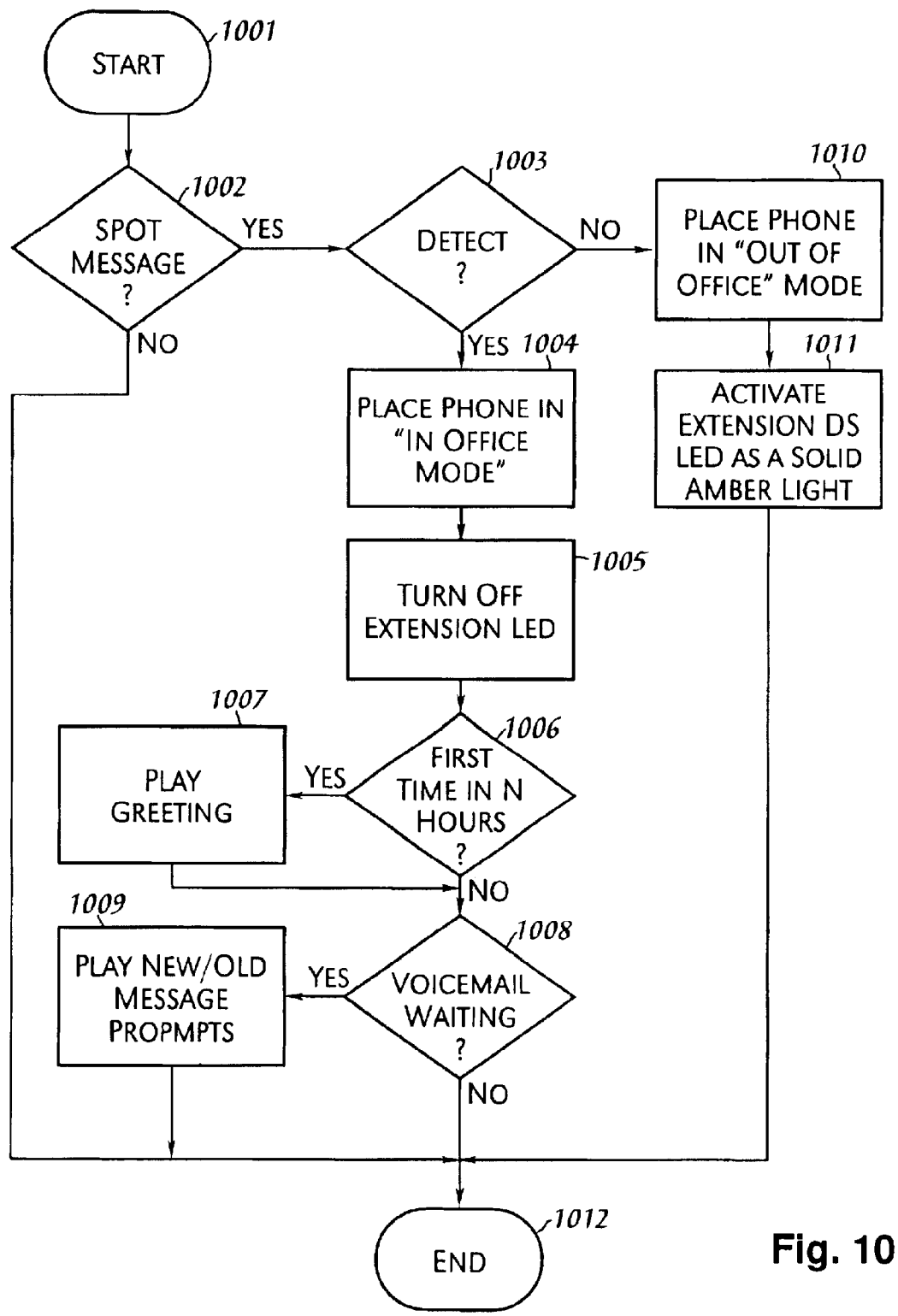
FIG. 10 illustrates a process for playing a greeting to a user upon detection of motion near the telephone set.

Referring next to FIG. 10, there is illustrated a process implemented within call processor 100 in accordance with the present invention. After the start step 1001, in step 1002, a determination is made whether a message has been received from the SPOT device 207 from the telephone 1400 and the P-card 300. If not, the process ends at step 1012. However if a message has been received in step 1002, then the process proceeds to step 1003 to determine if this message is a "detect" message or a "no detect" message. If the message is a "detect" message, then the process proceeds to step 1004 to place the telephone 1400 extension associated with the SPOT device 207 in an "in office" mode. Then, in step 1005, the extension LEDs on selected other telephones are turned off.

Next, in step 1006, a determination is made whether the detection of human presence has occurred for the first time in a selected number N of hours. N can be selected to be any number of hours by the system operator, or even the user of telephone 1400. If not, the process will merely proceed to step 1008. However, if the answer is "yes" to step 1006, the process will proceed to step 1007 to play some type of predetermined greeting to the person detected by the spot device 207 in the vicinity of the telephone 1400.

Thereafter, in step 1008, a determination is made whether there are any voice mail messages waiting for the user of the telephone 1400. If not, the process will merely end at step 1012. However, if there are messages waiting, then the process proceeds to step 1009, to play any new and/or old messages to the user of telephone 1400. Please note that steps 1007 and 1009 can be programmed to occur automatically without any further input by the user detected by the SPOT device 207 other than the detection of the user by the SPOT device 207.

Returning to step 1003, if the message received is a "no detect" message, then the process will proceed to step 1010 to place telephone 1400 in an "out of office" mode, which essentially informs system 100 that there is no person near the vicinity of telephone 1400. In step 1011, an extension DSS LED 1402 on selected other telephones within the system will be activated with a solid amber light. Please note that some other type of visual indication may be given to other telephone users within the system, such as an LCD indication that "John is out of his office."

For example, if "John" is not in his office, then a DSS LED 1402 on "Mary's" phone will be lit with a solid amber light, thus indicating to "Mary" that "John" is not in his office.

Figure 11:
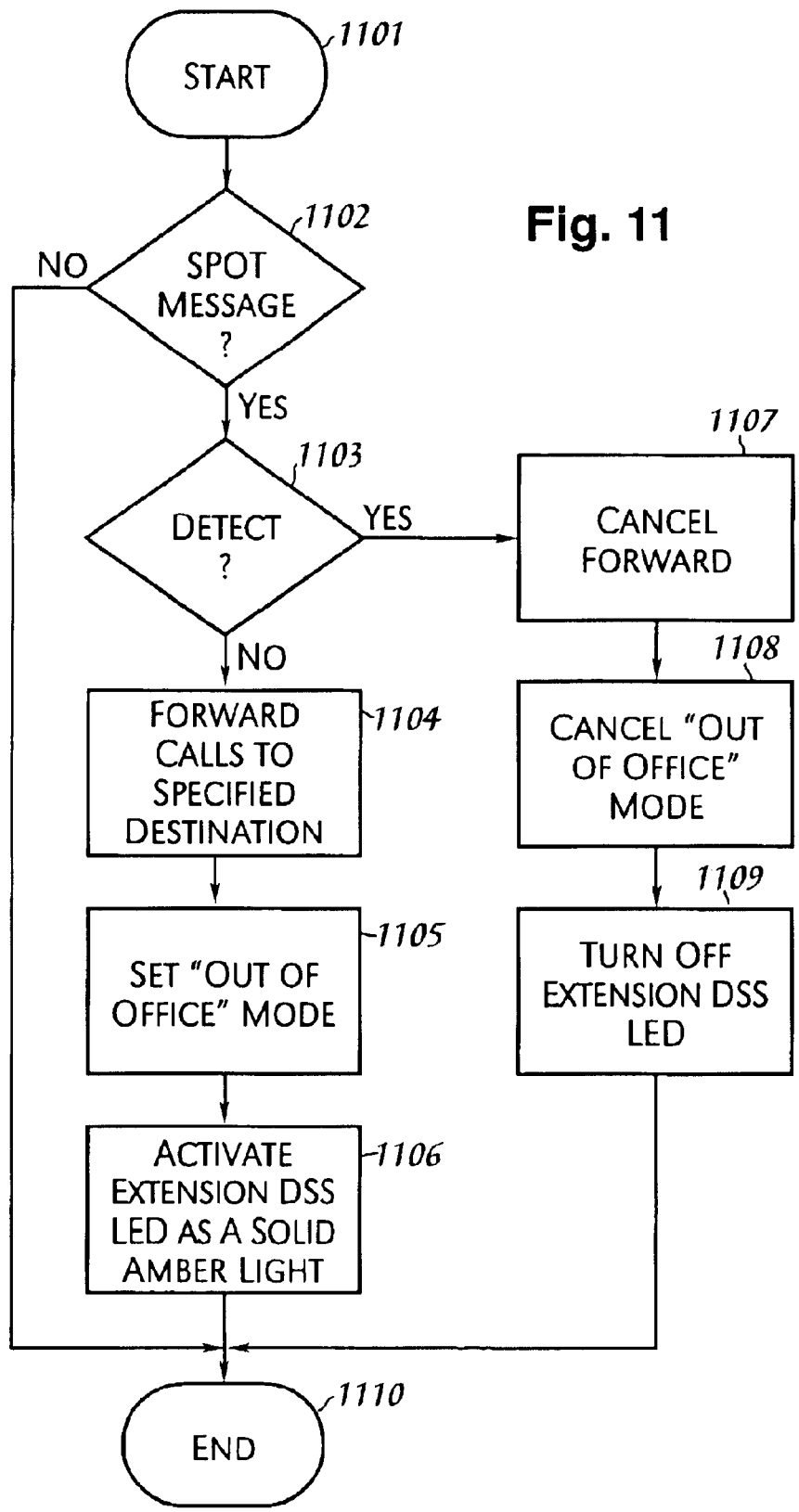
FIG. 11 illustrates a process for automatically forwarding incoming calls in response to no detection of motion near a telephone set in accordance with the present invention.

Referring to FIG. 11, there is illustrated a process beginning with start step 1101 for forwarding telephone calls as a function of a detection of human presence by a SPOT device 207. In step 1102, a determination is made whether a SPOT message has been received by processor 100. If not, the process merely ends at step 1110. However, if a SPOT message has been received in step 1102, the process proceeds to step 1103 to determine if this SPOT message is a "detect" message or a "no detect" message. If the message is a "no detect" message, then the process will proceed to step 1104, to forward any incoming calls to the telephone 1400 associated with the SPOT device 207 to a specified destination. For example, the user of telephone 1400 may program the extension to forward calls to another telephone extension when that person is out of their office. In step 1105, call processor 100 will set the extension associated with telephone 1400 in an "out of office" mode. Then, in step 1106, extension DSS LED(s) (or other type of indication) on other telephones may be given a solid amber light, in a manner as described above with respect to step 1011 in FIG. 10.

In step 1103, if a "detect" message has been received, then the process proceeds to step 1107 to cancel any forwarding instructions. In step 1108, any "out of office" mode previously set in step 1105 will be canceled and any extension DSS LED(s) 1402 on other telephones 1400 will be deactivated in step 1109.

Figure 12:
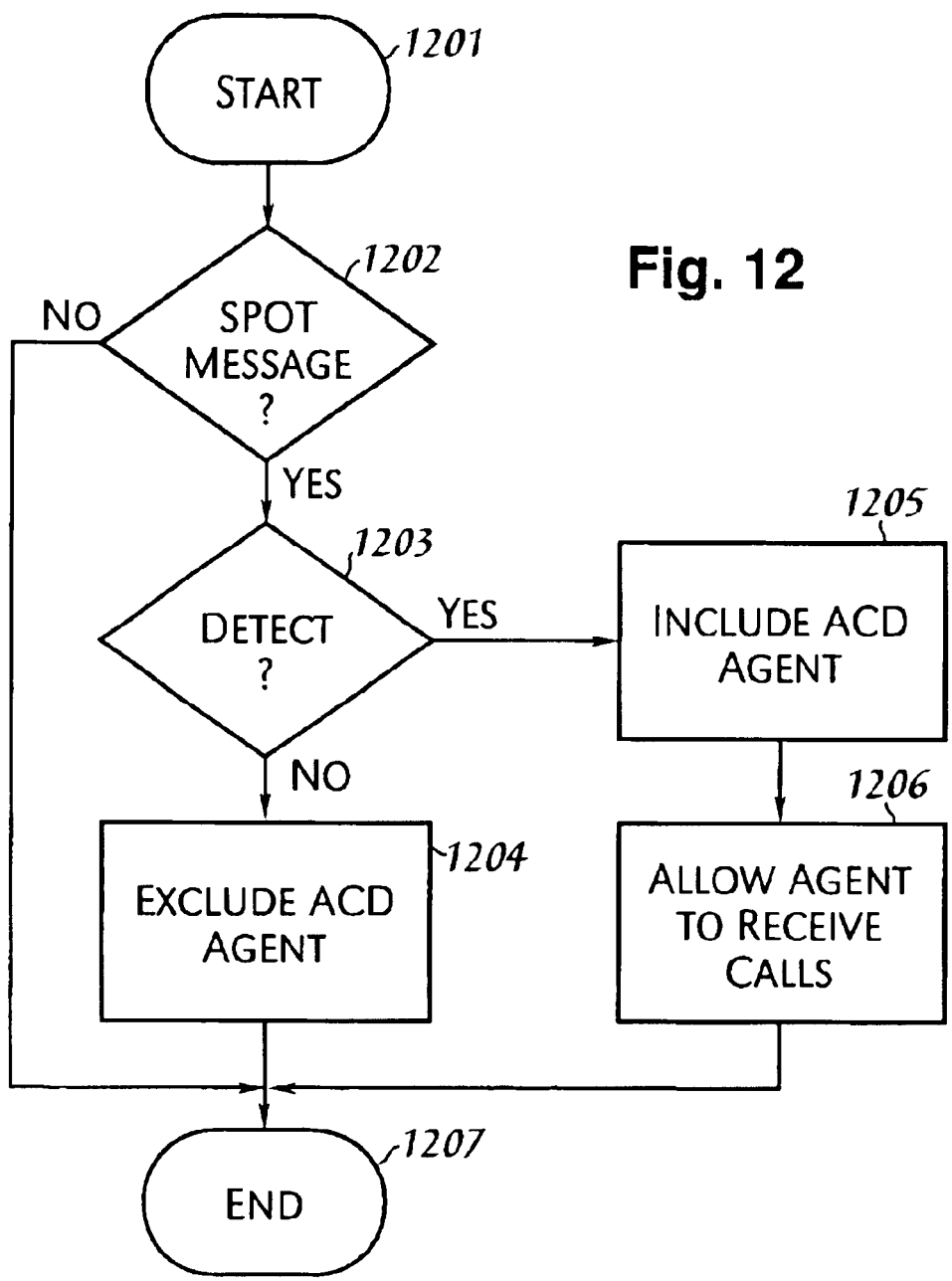
FIG. 12 illustrates a process for implementing the present invention in an ACD group.

Referring next to FIG. 12, there is illustrated an alternative embodiment of the present invention, whereby motion detection by a SPOT device 207 may be utilized within a telephone system used in an automatic call distribution (ACD) group. Such ACD groups are well known in the art as groups of extensions within a telephone system that are forwarded with incoming calls to the telephone system in a specified manner by the processor 100. The process illustrated in FIG. 12 may be implemented with any type of ACD program. After the beginning step 1201, the process proceeds to step 1202, to determine if a SPOT message has been received. If not, the process will end at step 1207. However, if in step 1202, a SPOT message has been received, then the process proceeds to step 1203 to determine if the message is a "detect" message or a "no detect" message. If the message is a "no detect" message, then in step 1204, the process will exclude the ACD agent associated with the telephone 1400 from the incoming call queue.

However, if the message received is a "detect" message, then in step 1205, the ACD agent associated with the telephone 1400 will be included in the incoming call queue by the ACD program, and in step 1206, that agent will be permitted to receive calls by the ACD program.

Figure 14:
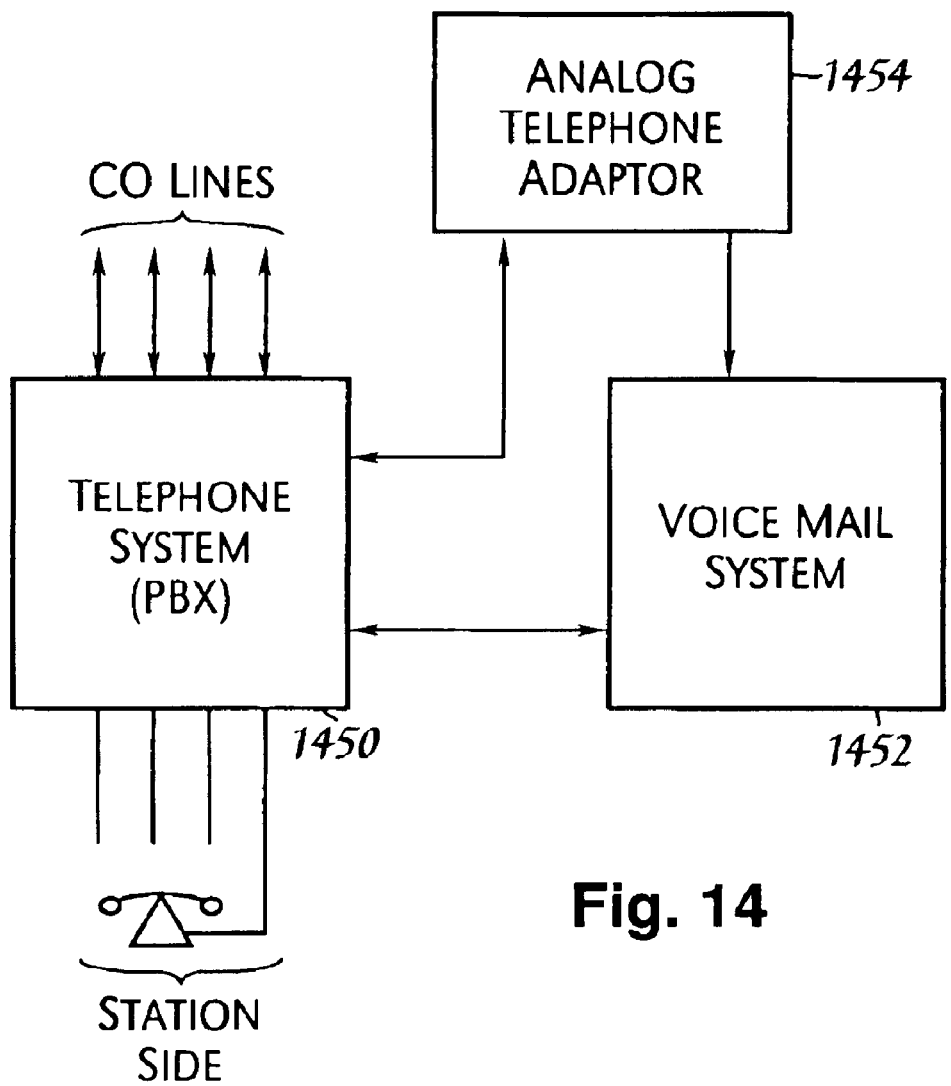
FIG. 14 illustrates an alternative telephone/voice mail system capable of implementing the present invention.

The present invention as described above with respect to FIGS. 4 and 9–13 may be implemented in any type of system that permits communications between users, especially remote users. One such alternative communication system is illustrated in FIG. 14, which shows a telephone/voice mail system configured in a different manner than as described above with respect to FIGS. 1–3 and 5–8. Telephone system (PBX) 1450 is connected to central office (CO) lines and to telephone stations. Telephone system 1450 makes use of a voice mail system 1452, which is separate from the telephone system 1450. Analog telephones may also be implemented using analog telephone adapter 1454. The principles of the present invention, i.e., the detection of human presence near terminals within the communications system, may be implemented with the telephone/voice mail system illustrated in FIG. 14.

The technology is already available, and it is merely a matter of time before the telephone/telecommunications world completely unites with the computer/Internet and other networking worlds. Essentially, all communications (voice and data, including video) will be provided over a communications system to a single terminal, which will be a hybrid of a computer and telephone. Already it is possible to have a voice conversation with a remote user over the Internet. Therefore, the present invention as described above with respect to FIGS. 4 and 9–13 is applicable and can be implemented in such a hybrid system, or even a computer network, such as a local area network (LAN), wide area network (WAN), intranet, or Internet.

Figure 15:
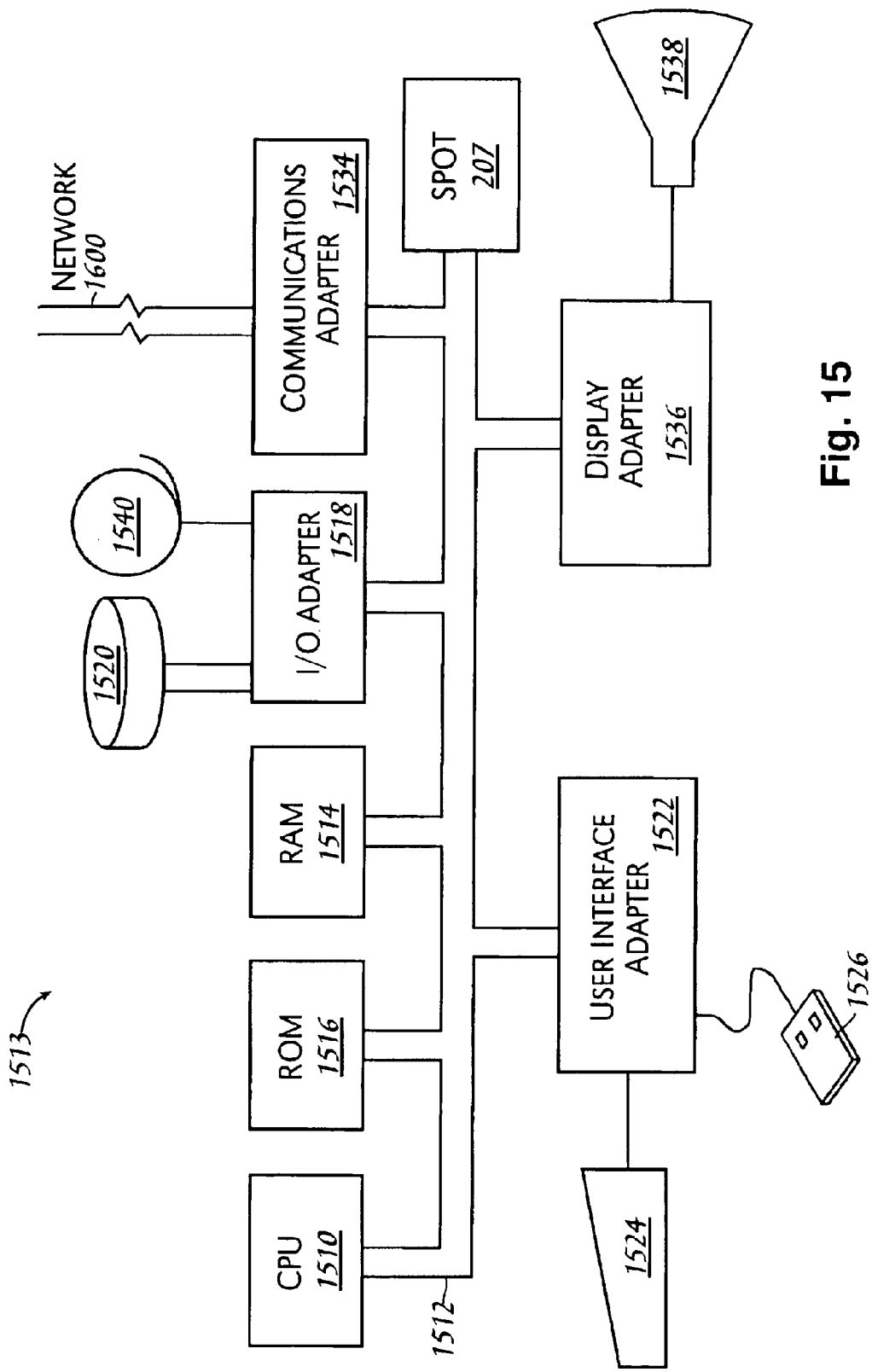
FIG. 15 illustrates a data processing system for implementing an alternative embodiment of the present invention.

FIG. 15 illustrates such a data processing (information handling) terminal workstation 1513 coupled to a spot device 207 in much the same way as described above with respect to FIG. 2. One skilled in the art would be able to connect the spot device 207 to the terminal 1513 to provide the needed signals for indicating the presence of a human object near the terminal 1513.

Workstation 1513 includes central processing unit (CPU) 1510, such as a conventional microprocessor, and a number of other units interconnected via system bus 1512. Workstation 1513 includes random access memory (RAM) 1514, read only memory (ROM) 1516, and input/output (I/O) adapter 1518 for connecting peripheral devices such as disk units 1520 and tape drives 1540 to bus 1512, user interface adapter 1522 for connecting keyboard 1524, mouse 1526, and/or other user interface devices such as a touch screen device (not shown) to bus 1512, communication adapter 1534 for connecting workstation 1513 to a data processing network 1600, and display adapter 1536 for connecting bus 1512 to display device 1538. CPU 1510 may include other circuitry not shown herein, which will include circuitry commonly found within a microprocessor, e.g., execution unit, bus interface unit, arithmetic logic unit, etc. CPU 1510 may also reside on a single integrated circuit.

Figure 16:
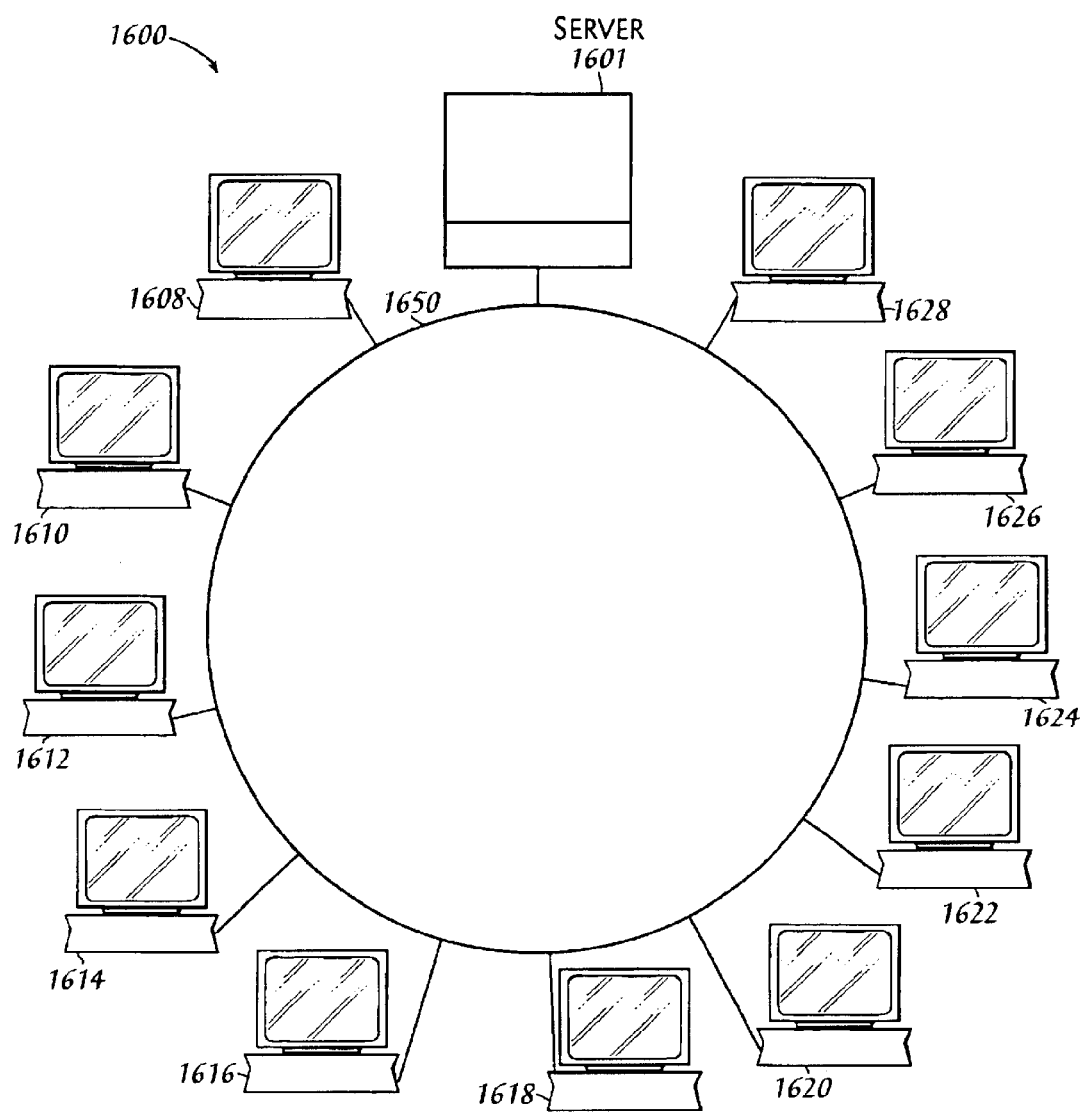
FIG. 16 illustrates a network implemented in accordance with the present invention.

Referring next to FIG. 16, such a network 1600 is illustrated having a plurality of communications terminals 1608, 1610, 1612, 1614, 1616, 1618, 1620, 1622, 1624, 1626, and 1628 (same as terminal 1513) connected over a network communications connection 1650 to a server 1601, which is operable for implementing the network 1600. The present invention as described above with respect to FIGS. 4 and 9–13 may be implemented as one or more software programs stored in any one or more of the communications terminals 1513 and the server 1601, enabling any user on the network 1600 to determine if another user at a separate terminal is within the vicinity of that terminal. The correlation would be the server 1601 operating in much the same manner as the system 100, and each of the terminals operating in much the same manner as the DKT 1400 having a spot device 207 coupled thereto, as illustrated in FIG. 15.

Figure 17:
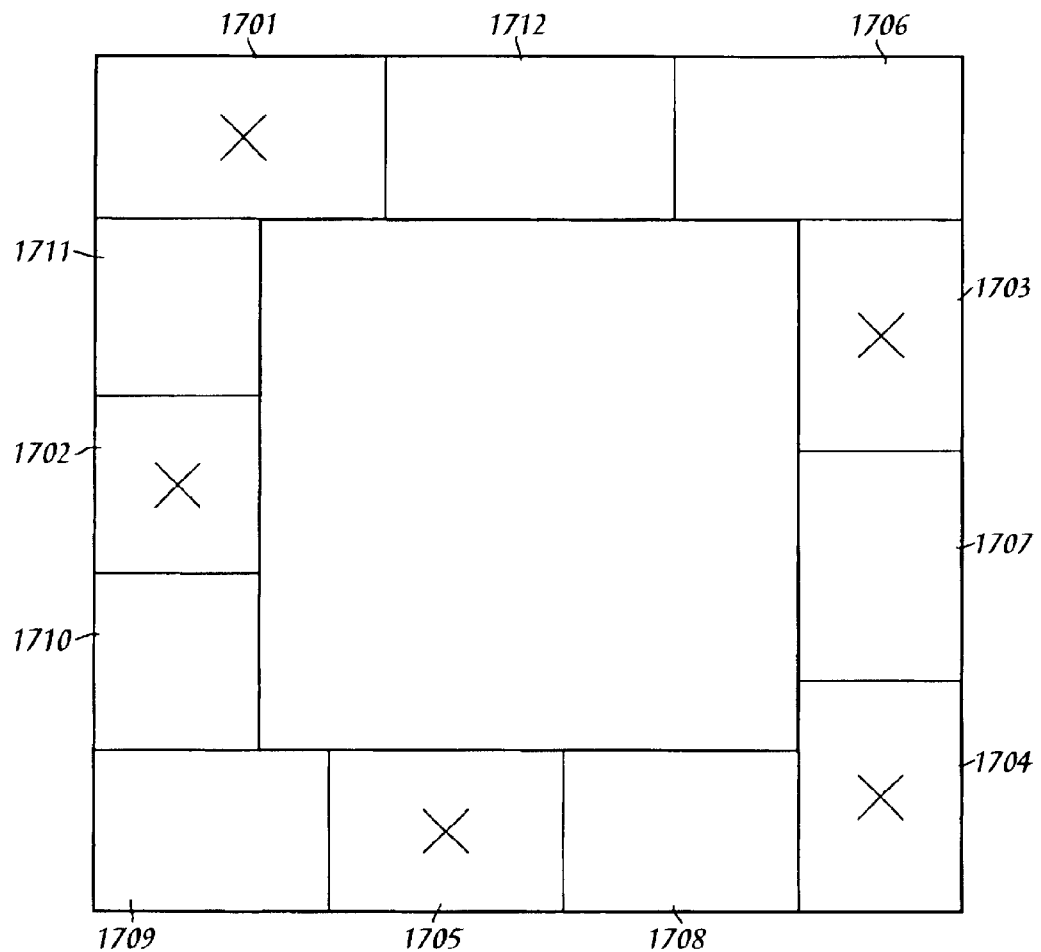
FIG. 17 illustrates a layout of offices in a building that is displayed on a computer screen for indicating who is in and out of their offices.

Referring next to FIG. 17, there is an exemplary illustration of a floor of offices within a building, which could be illustrated as a layout on any one of the aforementioned communications terminals 1513. Each of the offices 1701–1711 would have a communications terminal 1513 or 100 located therein with an attached spot device 207 for indicating when a person is in a respective office. The communications terminals would all be interconnected by a network, such as network 1600 described above with respect to FIG. 16. Each communications terminal within the network 1600 could display the layout illustrated in FIG. 17. If a spot device 207 within a particular office detects the presence of a human in that office, then an "X" would be illustrated on the layout in FIG. 17 within that particular office. As an example, FIG. 17 illustrates that there are persons within offices 1701–1705, while there are no persons within offices 1706–1712. This could be implemented easily through the use of the "out-of-office" and "in-office" modes (states) described above with respect to FIGS. 4 and 9–13, which are storable in a database that can be accessed by a program to display an "X" in association with a particular office.

Note that the present invention provides for the canceling of the forwarding of incoming calls to another telephone extension. This may also be implemented as the canceling of the forwarding of any other received communications by a terminal, such as the forwarding of e-mail messages to another terminal, or even the return of an automatic e-mail reply to the received e-mail message indicating that the person is out of the office. Furthermore, if a person is not at their terminal for a specified period of time, then the communications system may automatically reply to other terminals in the system that the person is away from their terminal when certain e-mail messages are received.

The present invention also contemplates the automatic forwarding of incoming calls to another terminal when a person is away from their office. This can also be used to forward received e-mail messages in a like manner.

The present invention has been described above with respect to the detection of the presence or absence of a human within the vicinity of a terminal (telephone, computer, etc.). However, the present invention may be expanded to detect the presence or absence of any specified object within the vicinity of a terminal. For example, object recognition software may be included in association with the spot device 207 to detect the presence or absence of a specified object. As an example, whether a light is on or off may be the specified object. Another example may be the presence or absence of an animal in the vicinity of the terminal. Yet still further, face recognition software may be implemented with the spot device 207 to indicate the presence or absence of a particular identified person. For example, if "John" is in the vicinity of the terminal, then an indication will be provided to the communications system that "John" is near the terminal. However, if "Joe" is in the vicinity of this terminal, an indication will be provided to the communications system that "John" is not in the vicinity of the terminal.

Although the present invention and its advantages have been described in detail, it should be understood that various changes, substitutions and alterations can be made herein without departing from the spirit and scope of the invention as defined by the appended claims.

What is claimed is:

1. A communications system comprising:
   a first terminal;
   a sensor coupled to the first terminal and operable for detecting human presence in a vicinity of the first terminal;
   circuitry operable for receiving a first signal, indicative of the detected human presence, from the sensor via the first terminal;
   circuitry operable for associating the detected human presence with the first terminal as a function of the signal; and
   circuitry for canceling any forwarding of communications to be received by the first terminal as a function of the association of the detected human presence with the first terminal.

2. The communications system as recited in claim 1, further comprising:
   circuitry, coupled to the associating circuitry, for sending a second signal to a second terminal indicating the detected human presence in association with the first terminal.

3. The communications system as recited in claim 2, wherein the second terminal includes a visual indicator that displays, in response to the second signal, the association between the detected human presence and the first terminal.

4. The communications system as recited in claim 1, further comprising:
   circuitry operable for receiving a third signal, indicative of human absence in the vicinity of the first terminal, from the sensor via the first terminal; and
   circuitry operable for associating the human absence with the first terminal as a function of the third signal.

5. The communications system as recited in claim 4, further comprising:
   circuitry, coupled to the associating circuitry, for sending a fourth signal to the second terminal indicating the human absence in association with the first terminal.

6. The communications system as recited in claim 5, wherein the second terminal includes a visual indicator that displays, in response to the fourth signal, the association between the human absence and the first terminal.

7. The communications system as recited in claim 1, further comprising:
   circuitry for automatically providing a message to the first terminal as a function of the association of the detected human presence with the first terminal.

8. The communications system as recited in claim 1, further comprising:
   circuitry for automatically playing messages on the first terminal as a function of the association of the detected human presence with the first terminal.

9. In a communications network, a method comprising the steps of:
   detecting presence or absence of an object in a vicinity of a first terminal;
   associating the detected presence or absence of the object with the first terminal as a function of a signal; and
   including an ACD agent operating the first terminal into an incoming call queue as a function of the association of the detected presence with the first terminal.

10. The method as recited in claim 9, further comprising the step of:
    in response to the associating step, sending a second signal to a second terminal indicating the detected presence or absence of the object in association with the first terminal.

11. The method as recited in claim 10, further comprising the steps of:
    in response to the second signal, displaying a visual indicator of the association between the detected presence or absence of the object and the first terminal.

12. The method as recited in claim 9, further comprising the step of:
    automatically providing a message to the first terminal as a function of the association of the detected presence with the first terminal.

13. The method as recited in claim 9, further comprising the step of:
    automatically playing messages on the first terminal as a function of the association of the detected presence with the first terminal.

14. A communications apparatus comprising:
    a terminal adapted for operating as a node on a communications system;
    a sensor coupled to the terminal and operable for detecting presence or absence of an object in a vicinity of the terminal; and
    circuitry for canceling any forwarding of communications to be received by the terminal as a function of the association of the detected presence of the object with the terminal.

15. The apparatus as recited in claim 14, wherein the terminal further comprises:
    circuitry operable for receiving a signal from the sensor indicative of the detected presence or absence of the object; and
    circuitry operable for sending to the communications system a detect message or a no detect message in response to the received signal.

16. The apparatus as recited in claim 14, further comprising:
    a visual indicator operable for displaying an indication that presence of an object has been detected in a vicinity of another terminal coupled to the communications system.

17. A telephone system comprising:
    a first telephone set having a first extension associated therewith;
    a second telephone set having a second extension associated therewith;
    a sensor coupled to the first telephone set and operable for detecting presence of a person, or a lack thereof, in a vicinity of the first telephone set; and
    a call processor coupled to the first and second telephone sets and to the sensor, wherein the call processor further comprises:
       circuitry for sending a signal to the second telephone set indicating that presence of the person has or has not been detected by the sensor; and circuitry for forwarding calls from the first telephone set to the second telephone set in response to the lack of the presence of the person in the vicinity of the first telephone set.

18. The telephone system as recited in claim 17, wherein the call processor further comprises:

circuitry for receiving from the sensor via the first telephone set a signal indicating whether presence of the person has or has not been detected; and circuitry for determining, in response to receipt of the signal from the sensor, that the detected presence of the person or lack thereof is associated with the first extension.

19. The telephone system as recited in claim 17, wherein the second telephone set includes a visual indicator that indicates that presence of the person has or has not been detected by the sensor in response to the signal received from the call processor.

20. The telephone system as recited in claim 17, further comprising:

circuitry for canceling any forwarding of calls from the first telephone set to the second telephone set as a function of the association of the detecting the presence of the person with the first telephone set.

21. A communications system comprising:

a first terminal;

a sensor coupled to the first terminal and operable for detecting human presence in a vicinity of the first terminal;

circuitry operable for receiving a first signal, indicative of the detected human presence, from the sensor via the first terminal;

circuitry operable for associating the detected human presence with the first terminal as a function of the signal;

circuitry operable for receiving a third signal, indicative of human absence in the vicinity of the first terminal, from the sensor via the first terminal;

circuitry operable for associating the human absence with the first terminal as a function of the third signal; and circuitry for forwarding calls to another terminal in response to the human absence in the vicinity of the first terminal.

22. A communications system comprising:

a first terminal;

a sensor coupled to the first terminal and operable for detecting human presence in a vicinity of the first terminal;

circuitry operable for receiving a first signal, indicative of the detected human presence, from the sensor via the first terminal;

circuitry operable for associating the detected human presence with the first terminal as a function of the signal; and circuitry for including an ACD agent operating the first terminal into an incoming call queue as a function of the association of the detected human presence with the first terminal.

23. A communications system comprising:

a first terminal;

a sensor coupled to the first terminal and operable for detecting human presence in a vicinity of the first terminal;

circuitry operable for receiving a first signal, indicative of the detected human presence, from the sensor via the first terminal;

circuitry operable for associating the detected human presence with the first terminal as a function of the signal;

circuitry operable for receiving a third signal, indicative of human absence in the vicinity of the first terminal, from the sensor via the first terminal;

circuitry operable for associating the human absence with the first terminal as a function of the third signal; and circuitry for excluding an ACD agent from an incoming call queue in response to the human absence in the vicinity of the first terminal.

24. A communications system comprising:

a first terminal;

a sensor coupled to the first terminal and operable for detecting human presence in a vicinity of the first terminal;

circuitry operable for receiving a first signal, indicative of the detected human presence, from the sensor via the first terminal;

circuitry operable for associating the detected human presence with the first terminal as a function of the signal;

circuitry for automatically providing a message to the first terminal as a function of the association of the detected human presence with the first terminal; and circuitry for determining if the detected human presence was preceded by a specified amount of time where no human presence was detected by the sensor before providing the message to the first terminal.

25. In a communications network, a method comprising the steps of:

detecting presence or absence of an object in a vicinity of a first terminal;

associating the detected presence or absence of the object with the first terminal as a function of a signal; and canceling any forwarding of communications to be received by the first terminal as a function of the association of the detected presence of the object with the first terminal.

26. In a communications network, a method comprising the steps of:

detecting presence or absence of an object in a vicinity of a first terminal;

associating the detected presence or absence of the object with the first terminal as a function of a signal; and forwarding communications to another terminal in response to the absence of the object in the vicinity of the first terminal.

27. In a communications network, a method comprising the steps of:

detecting presence or absence of an object in a vicinity of a first terminal;

associating the detected presence or absence of the object with the first terminal as a function of a signal; and excluding an ACD agent from an incoming call queue in response to the absence of the object in the vicinity of the first terminal.

28. In a communications network, a method comprising the steps of:

detecting presence or absence of an object in a vicinity of a first terminal;

associating the detected presence or absence of the object with the first terminal as a function of a signal;

automatically providing a message to the first terminal as a function of the association of the detected presence with the first terminal; and determining, before performing the automatically providing step, if the detected presence was preceded by a specified amount of time where absence of the object was detected by the sensor before providing the message to the first terminal.

29. A communications apparatus comprising:

a terminal adapted for operating as a node on a communications system;

a sensor, coupled to the terminal and operable for detecting presence or absence of an object in a vicinity of the terminal; and circuitry for including an ACD agent operating the terminal into an incoming call queue as a function of the association of the detected presence with the terminal.

30. The apparatus as recited in claim 29, further comprising:

circuitry for excluding the ACD agent from the incoming call queue in response to the absence of the object in the vicinity of the terminal.

31. A communications apparatus comprising:

a terminal adapted for operating as a node on a communications system;

a sensor coupled to the terminal and operable for detecting presence or absence of an object in a vicinity of the terminal; and circuitry for determining if the detected presence was preceded by a specified amount of time where absence of the object was detected by the sensor before providing a message to the terminal.

32. A telephone system comprising:

a first telephone set having a first extension associated therewith;

a second telephone set having a second extension associated therewith;

a sensor coupled to the first telephone set and operable for detecting presence of a person, or a lack thereof, in a vicinity of the first telephone set; and a call processor coupled to the first and second telephone sets and to the sensor, wherein the call processor further comprises:

circuitry for sending a signal to the second telephone set indicating that presence of the person has or has not been detected by the sensor; and circuitry for excluding an ACD agent from an incoming call queue in response to the lack of the presence of the person in the vicinity of the first telephone set.

33. The telephone system as recited in claim 32, further comprising:

circuitry for including an ACD agent operating the first telephone set into the incoming call queue as a function of the association of the detected presence of the person with the first telephone set.

* * * * *